United States Patent [19]
Skaarup

[11] Patent Number: 5,443,361
[45] Date of Patent: Aug. 22, 1995

[54] PLANT FOR THE RECOVERY OF ENERGY FROM WAVES IN WATER

[76] Inventor: Erik Skaarup, Jaegersborg Alle 26, DK-2920 Charlottenlund, Denmark

[21] Appl. No.: 211,840
[22] PCT Filed: Nov. 1, 1991
[86] PCT No.: PCT/DK91/00329
  § 371 Date: Apr. 28, 1994
  § 102(e) Date: Apr. 28, 1994
[87] PCT Pub. No.: WO93/09347
  PCT Pub. Date: May 13, 1993
[51] Int. Cl.$^6$ .............................................. F03B 13/12
[52] U.S. Cl. ........................................ 415/3.1; 415/4.1; 415/7; 415/906; 416/85; 416/DIG. 4; 60/398; 290/53
[58] Field of Search ................... 415/2.1, 3.1, 4.1, 4.2, 415/4.3, 4.4, 4.5, 7, 905, 906, 9807, 908; 416/9, 85, DIG. 4; 290/42, 53; 60/499, 501–503, 398; 405/76, 77

[56] References Cited

U.S. PATENT DOCUMENTS

| | | | |
|---|---|---|---|
| 1,474,571 | 11/1923 | Wielgolaski | 415/3.1 |
| 2,135,115 | 11/1938 | Schlachter | 416/85 |
| 3,687,567 | 8/1972 | Lininger | 415/7 |
| 4,152,895 | 5/1979 | Wirt | |
| 4,179,886 | 12/1979 | Tsubota | 60/398 |
| 4,263,516 | 4/1981 | Papadakis | |
| 4,843,249 | 6/1989 | Bussiere | 416/85 |

FOREIGN PATENT DOCUMENTS 2548738 1/1985 France .

Primary Examiner—Edward K. Look
Assistant Examiner—Christopher Verdier
Attorney, Agent, or Firm—Stevens, Davis, Miller & Mosher

[57] ABSTRACT

A plant for recovering energy from waves in motion comprises a wedge-shaped unit, anchored, and self-adjusting towards the waves. The floating reception unit (1) is placed in the water and has a ramp (3) for the waves and a guide device (4) guiding the water to a reception pipe (8) and into an energy converting engine (9). The guide device comprises a number of reception funnels (4), the cross sections of which are narrowed down in the direction towards the energy converting engine (9). The plant also comprises a number of air chambers (16) and side chambers (10) in which the reception pipes (8) end.

10 Claims, 3 Drawing Sheets

PLANT FOR THE RECOVERY OF ENERGY FROM WAVES IN WATER

BACKGROUND OF THE INVENTION

The invention relates to a plant for recovering energy from waves in motion on the surface of a body of water.

A known plant of this type is described in SE Patent publication no. 443,026. In principle, this known plant comprises a semidomed, bell-like construction floating in the water and taking water in at the top. The water is guided to a reception pipe which guides the water to a turbine driving a generator for electrical energy. The known construction also provides the possibility of applying an elongated pipe extending parallel with the water surface and having the same diameter throughout its length, which pipe ends in a diffuser for a water outlet.

This plant is arranged to float partially submerged and the waves are caught by an upwardly-extending tower with openings in all directions allowing the water in the waves to run through the openings irrespective of the direction of the waves in relation to the plant. It is an unfavourable construction in respect of energy, as only a small part of the waves are caught; consequently, only a part of the wave energy is recovered.

Besides, this construction has not considered the principle that water seeks its own level, as the diffuser of the plant is placed in direct continuation of the horisontal pipe. A wave passing perpendicularly to this construction will stop most of the outlet.

SUMMARY OF THE INVENTION

The plant according to the invention has the advantage that the acquired device concentrates and utilizes the energy, i.e. both the kinetic and the potential energy in the waves, and guides the caught water to an energy converting engine without applying particular movable parts. Due to the design of the plant a large amount of water is collected currently throughout the length of the device, so that maximum energy recovery is achieved.

By designing the plant according to the invention it is ensured that the plant will not ride the waves, but that the waves will break over the plant. Furthermore, in the present invention the water admission velocity is increased through a plurality of reception funnels, so that the water reaches the turbine at an increased speed.

The water does not run out of the reception funnels when a wave has passed the plant.

The plant is preferably designed so that automatic regulation of the water admission to the turbine is obtained and the admission of water to the turbine is regular, even if there is a great distance between the waves.

Another objective of the present invention is that the recovered energy is optimized, as the direction of flow of the water is not changed substantially and the amount of water which would otherwise have passed over the plant is returned to the reception funnels.

Another objective of this invention is that great velocity of discharge of the water in the reception pipe is ensured.

A further objective is that the plant divides an admitted wave in such a manner that the plant is evenly loaded and the reception funnels are filled successively as the wave passes the plant, so that the admission of water is even; the admission of water to the water turbine will thus be even and constant.

BRIEF DESCRIPTION OF THE DRAWING

Other objectives and advantages of the invention will be apparent from the accompanying drawings in which.

DESCRIPTION OF THE PREFERRED EMBODIMENT

Figure 1:
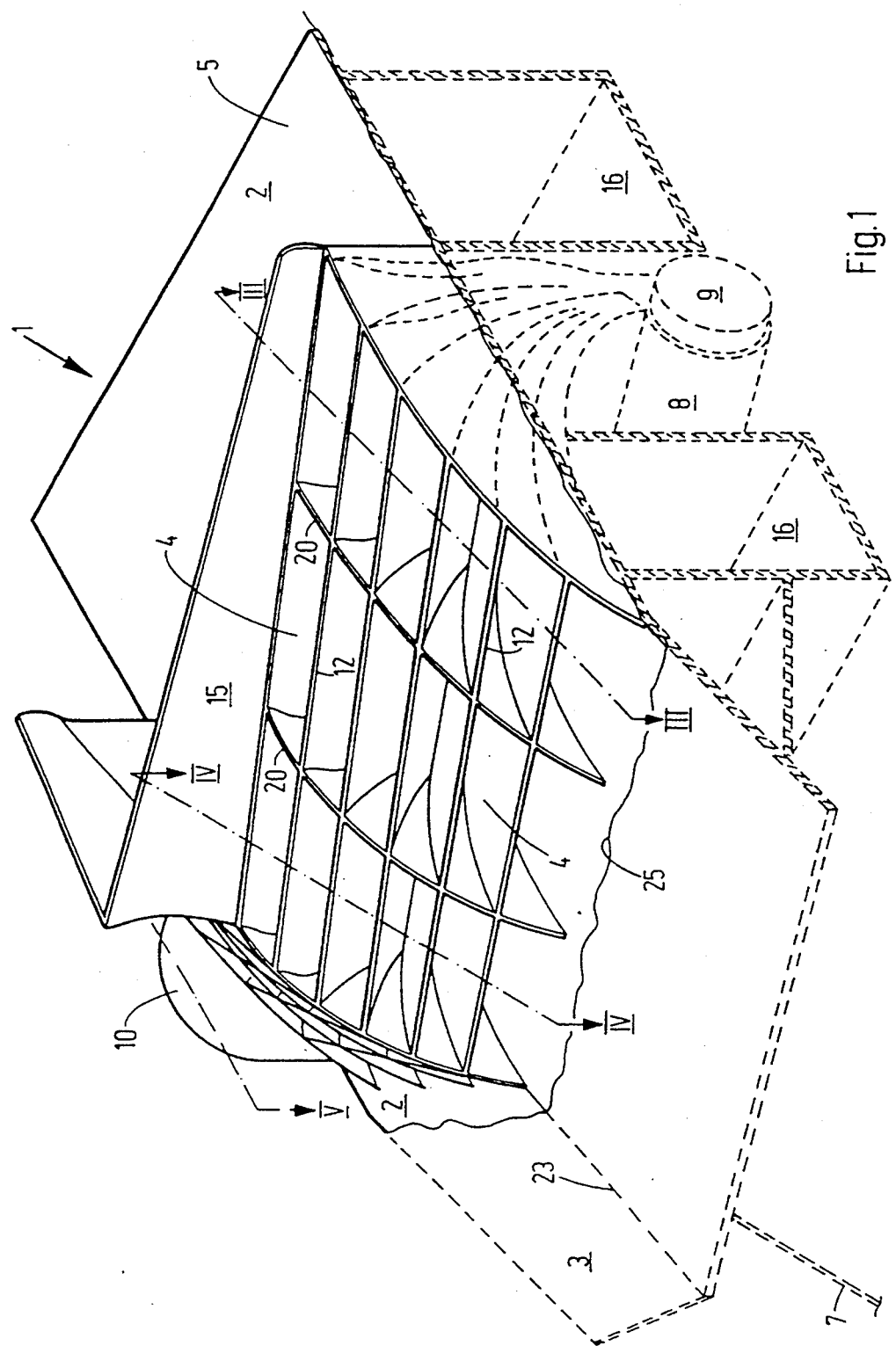
FIG. 1 is a perspective view from the top showing the plant in general but partially intersected cut off at one side thereof.

FIG. 1 is a perspective front view of the plant in general according to the invention and in order to look into the construction its right side has been removed.

The plant comprises a float 2, a part of which is above the water surface 25 while the rest is below the surface. The plant is anchored to an anchor by means of an anchor cable or an anchor chain 7 which will later be explained in more detail. The plant is substantially wedge-shaped with central point and the anchor cable is attached so that, due to wind action the plant will straighten out and thus will always turn its central point towards the incoming waves. In the end where the wave hits the plant first, i.e. at the pointed central end of the plant, it comprises a ramp 3 extending down below the surface in an inclined manner allowing incoming waves to roll up the ramp and over the construction. Besides, the float 2 is roof-ridge-formed with the roof ridge 23 in the longitudinal direction. The plant is kept floating by a number of air chambers 16 being adjusted in such a manner that substantially only the reception funnels 4 and the shield 15 are above the water surface, cf. FIG. 1.

When the waves roll into and up over the construction, the funnels 4 will be filled with water which at great speed is guided down into a reception pipe 8 through the narrowed course of the funnels, which pipe 8 at both ends is provided with a turbine with an energy converting engine 9, e.g. for generating electrical energy, which through a cable (not shown) is conducted to an ordinary power supply system, possibly via a switch or converter station.

The stern 5 of the construction will usually be below the water surface.

The funnels 4 are formed of curved or bent shells or plates 12 and side plates 20 which additionally make up partition plates, so that the funnels 4 are arranged in sections. The arrangement of the funnels 4 is moreover arrow-shaped with the point directed towards the anchor cable 7 and the roof ridge 23, of FIG. 1.

Behind the funnels 4 is placed an oblong shield 15 to throw a part of the crest of the wave, which would otherwise roll over the construction, back towards and down into the funnels.

Due to the fact that the construction is wedge-shaped with the roof ridge 23 and due to the arrangement of the funnels, an incoming wave will be divided in two and distribute itself over the two sides of the plant, as the funnels are filled successively with water. The utilization of the amount of water in a wave is hereby increased resulting in a continuous supply of water to the turbine 9. The shield is highest at the middle and may be designed in such a manner that the curvature increases towards each side.

The reception pipe 8 is actually made up of two pipes extending from the middle under the roof ridge 23. The arrangement of the pipes 8 is also arrow-shaped and forms a more acute angle than does the arrow-shaped arrangement of the funnels 4.

Each side the plant is provided with a side chamber 10. The side chamber is partially filled with air and through the turbine 9 the reception pipe 8 opens at each side into the chamber 10, which will be explained in more detail with reference to FIG. 5 of the drawing.

Figure 2:
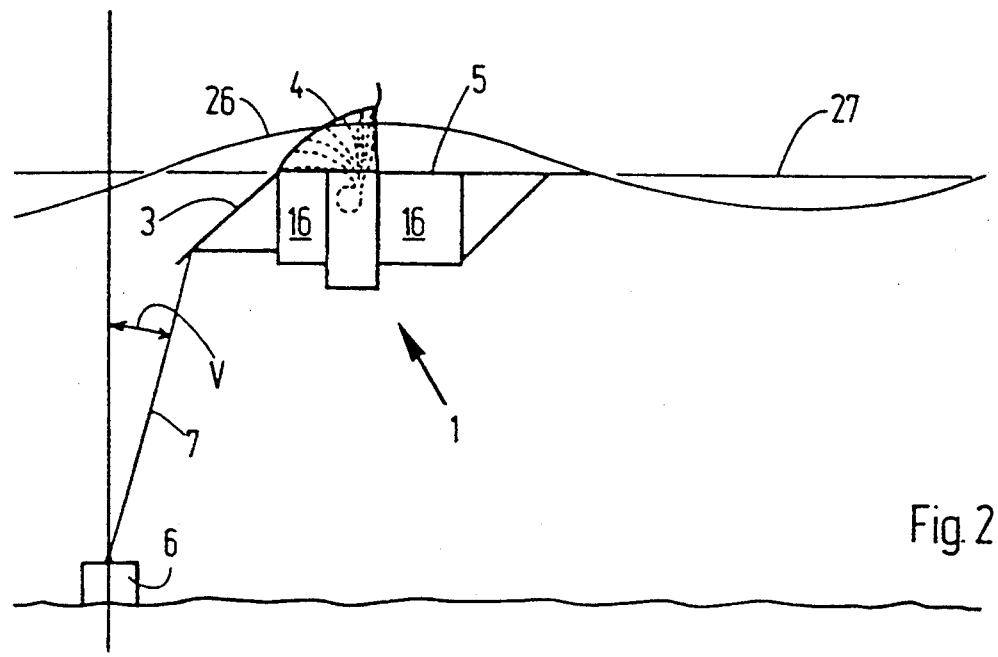
FIG. 2 is a side view of the plant on a smaller scale shown floating in a body of water.

FIG. 2 shows in more detail how the plant according to the invention floats in the water surface 27 and how a wave 26 passes the plant. An anchor 6 secures the plant 1 by means of an anchor chain or an anchor cable 7, which probably at the very top at the construction itself is subdivided, e.g. tripartited. The anchor chain must have such a length that at high water the chain forms an angle of at least 60° in relation to the horisontal plane or an angle V of 30° in relation to the vertical plane as shown in the drawing. The plant is hereby prevented from riding the waves, and maximum energy recovery is achieved.

Figure 3:
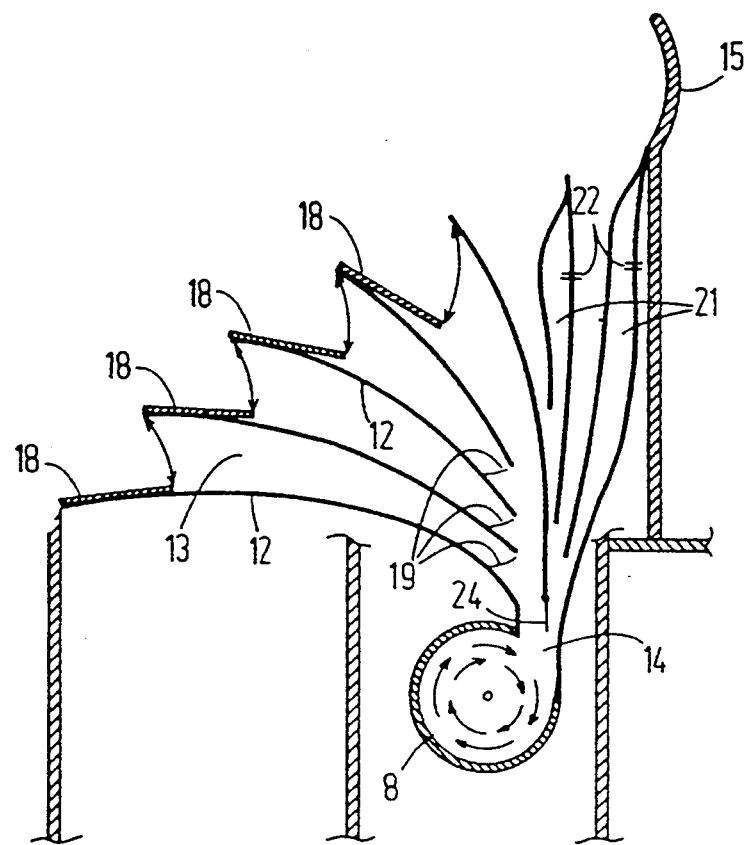
FIG. 3 is a sectional view on line III—III in FIG. 1.

FIG. 3 shows a vertical plane section through the outer funnels. The funnels are formed of shells or plates 12 extending forward towards the incoming wave. Between the shells 12 gaps 13 are formed narrowed down cross sections in order to increase the velocity of the water. Some of the shells, preferably those in the lowest position, are provided with valve flaps 18 which will close if the water tries to flow back and out through the gaps 13. The valve flaps 18 may be made of reinforced rubber or the like and designed in such a manner that they are self-closing without mechanical maneuvering members.

The other end of the passages may also comprise valve flaps 19 preventing water from the more vertically positioned gaps from flowing out through the forward extending gaps. These valves are also valve flaps of reinforced rubber or the like without mechanical maneuvring members. The vertically positioned gaps or water chambers may be designed having damming or reservoir chambers 21, in which the water can be dammed up before later running into the reception pipe 8. As an example the reservoir chambers 21 have air escape openings 22 at the top of the chambers allowing possible air in the chambers to be pressed out this way. To ensure correct admission of water to the inlet pipe 14 of the reception pipe 8 a pivoting guide plate 24 may be placed here, so that water pressure at the one side of the guide plate blocks the inlet from the opposite side.

The water is moreover guided tangentially through the inlet 14 into the reception pipe 8 in such a manner that the water in the reception pipe flows along a helical line towards the turbine 9.

Figure 4:
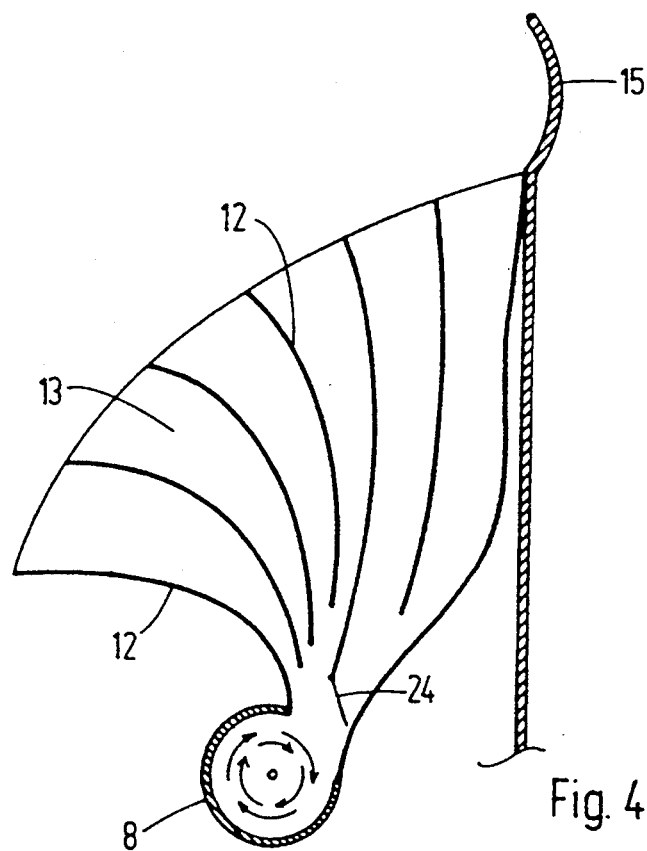
FIG. 4 is a sectional view on line IV—IV in FIG. 1.

FIG. 4 shows a plane part section in the reception funnels close to the middle of the plant. It appears that the reception funnels at the middle of the construction have no reservoir chambers and that the reception pipe 8 is more-over positioned further ahead due to the fact that the pipe 8 extends towards the rear in an inclined manner viewed from the middle of the construction.

Figure 5:
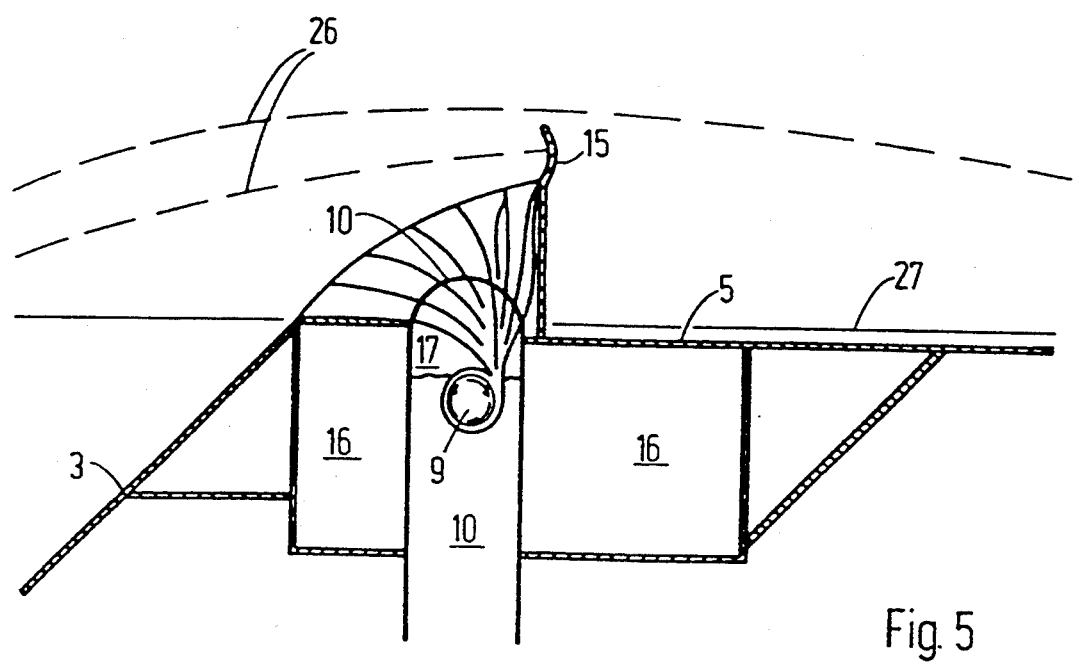
FIG. 5 is a sectional view on line V—V in FIG. 1.

FIG. 5 shows how the water outlet from the turbine 9 takes place in the side chamber 10. The side chamber comprises an outlet chamber 17 partially filled with air, where the water from the reception pipe is guided through the turbine 9 out into the chamber and further out into the sea. When the waves roll over the construction and the water is guided down through the funnels, some air will be carried along which will collect at the top of the outlet chamber 17. The outlet chamber 17 has suitable means ensuring that the air leaves the chamber in a suitable manner so that a desired liquid level is maintained.

All parts of the plant are made of strong materials, preferably as a welded steel construction strong enough to stand the tremendous strain the whole construction is exposed to. Besides, all parts are made of corrosion resistant materials.

The embodiment shown in the drawing and explained in the description being only an example, it is at any rate a preferred example of how a plant according to the invention can be designed. It will be obvious to a person skilled in the art to design the plant in many different ways without deviating from that which is stated in the below patent claims. It will be obvious to a person skilled in the art that the size and strength etc. of the plant depends on where the plant is intended to be used, the maximum wave heights of the place in question and the average wave frequency. It will thus be possible within the scope of the invention to produce plants varying greatly in size.

I claim:

1. A plant for floating on a surface of a body of water and recovering energy from wave action in said body of water comprising
    a wedge shaped body with a central point and anchor means extending from the area of said central point so that wind action will maintain said body with a leading edge facing toward said waves;
    said body having a ramp for entrance of said waves and a guide device for guiding said waves to a reception pipe located within said body;
    an energy converting engine in communication with said reception pipe;
    said guide device comprising a plurality of water reception funnels formed of curved plates arranged to define a plurality of gaps between adjacent plates, said gaps having a cross-section which narrows down in a direction toward said energy converting engine;
    said curved plates having inlet edges positioned to receive said waves and exit edges facing toward said energy converting engine; said inlet edges being mutually displaced in a steplike configuration with a lowest positioned inlet edge being closest to said leading edge of said body.

2. The plant of claim 1 in which the anchor means comprises an anchor cord and an anchor, said cord having a length such that at a high water level the cord forms an angle of at least 60° in relation to a horizontal plane.

3. The plant of claim 1 including a plurality of vertical partitions extending between said curved plates and generally perpendicular thereto.

4. The plant of claim 1 including a plurality of one way flap valves adjacent the inlet edges of said plates.

5. The plant of claim 4 including a second plurality of one way flap valves adjacent the exit edges of said plates.

6. The plant of claim 1 including a reservoir chamber associated with at least one of said water reception funnels, said reservoir chamber being open towards the bottom area of its associated funnel.

7. The plant of claim 1 in which said reception pipe extends downwardly from said leading edge, said reception pipe having a water turbine at an end thereof for driving said energy converting engine.

8. The plant of claim 1 further including a generally vertically extending shield spaced away from leading edge and from said funnels, said shield having a vertical height greater than the vertical height of said funnels.

9. The plant of claim 1 including air chambers at each side of said reception pipe and an outlet chamber which is partially filled with air and is in communication with one end of said reception pipe.

10. The plant of claim 1 in which said leading edge of said body has a central ridge member and said reception funnels are positioned on each side of said ridge member so as to be generally arrow shaped and pointing toward incoming waves.

* * * * *